June 24, 1930. J. L. DROHEN 1,767,969
ADJUSTABLE AWNING
Filed June 13, 1927   2 Sheets-Sheet 1
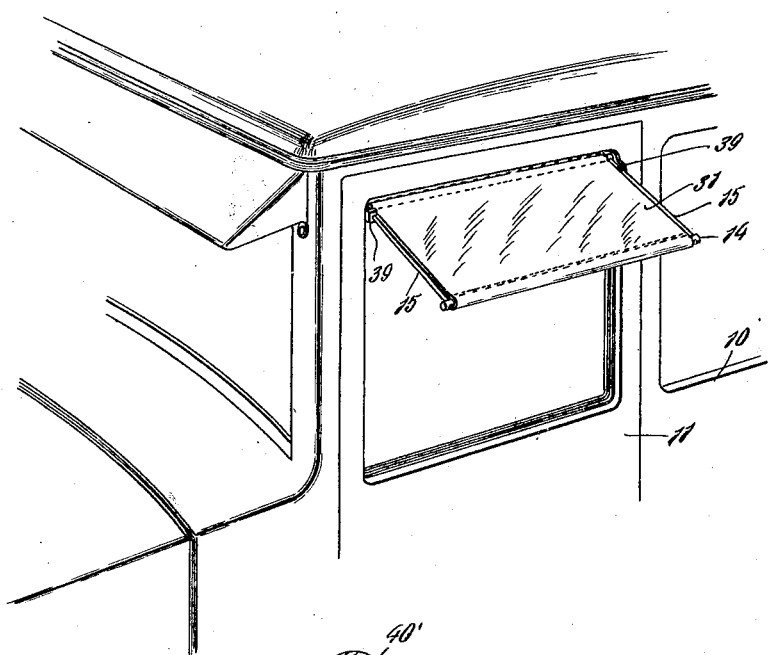
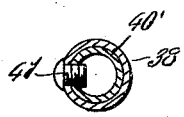
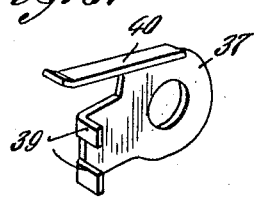
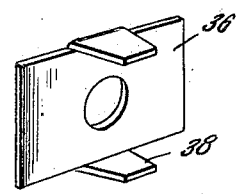
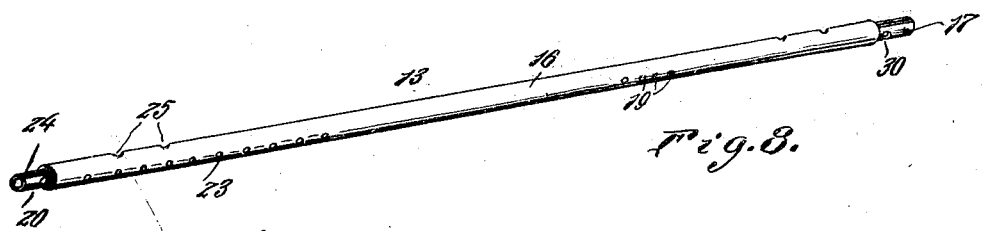
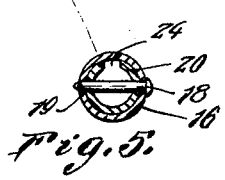
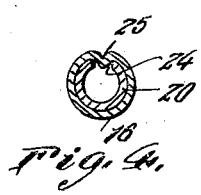

June 24, 1930.　　　　J. L. DROHEN　　　　1,767,969
ADJUSTABLE AWNING
Filed June 13, 1927　　　2 Sheets-Sheet 2
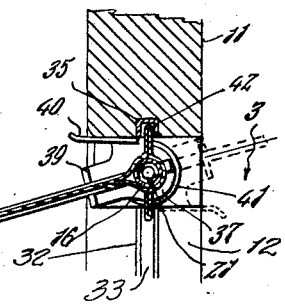
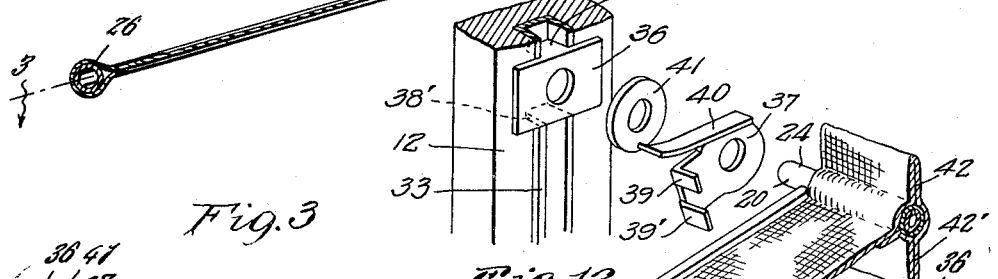
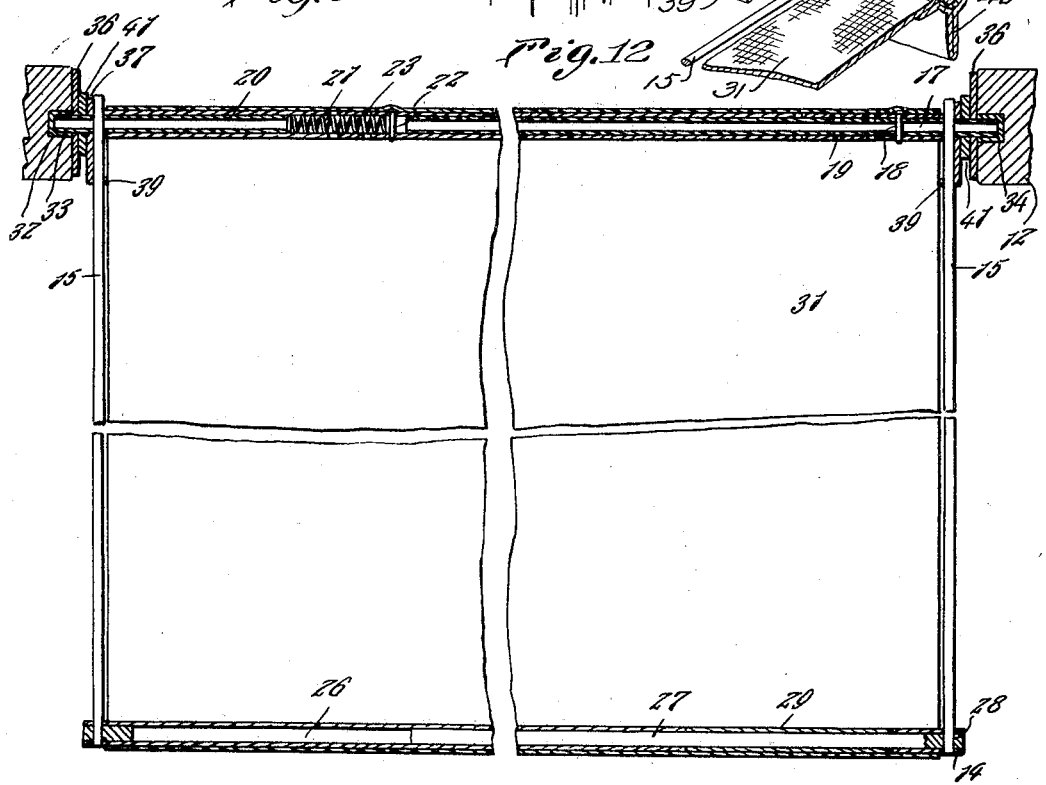
INVENTOR
J. L. Drohen
BY Victor J. Evans
ATTORNEY Patented June 24, 1930

1,767,969

UNITED STATES PATENT OFFICE

JAMES L. DROHEN, OF DUNKIRK, NEW YORK

ADJUSTABLE AWNING

Application filed June 13, 1927. Serial No. 198,543.

This invention relates to improvements in awnings for windows, doors and the like, the invention being especially adapted for automobiles.

An object of the present invention is to provide an awning which may be conveniently installed within a window opening without requiring the boring of holes for the attachment of bearing plates, means being provided for securely attaching the awning in place within the guide grooves upon opposite sides of a window opening.

Another object of the invention is the provision of means for adjusting the frame of the awning to the width of the window opening, and for adjusting the frames to maintain the awning in properly taut condition, the means utilized for the latter purpose also serving to hold the awning extended at any desired angle when in use, or for maintaining the said awning in an out of the way position when desired.

Another object of the invention is the provision of means included in the awning structure for preventing the entrance of wind or rain through the window, either when the awning is in or out of use.

With the above and other objects in view, the invention further includes the following novel features and details of construction, to be hereinafter more fully described, illustrated in the accompanying drawings and pointed out in the appended claims.

In the drawings:—

Figure 1 is a perspective view showing a fragmentary portion of an automobile with the invention applied.

Figure 2 is a vertical sectional view of the same on an enlarged scale.

Figure 3 is a view partly in horizontal section and partly in plan with parts broken away.

Figures 4 and 5 are enlarged transverse sections through the inner bar of the awning frame.

Figure 6 is a detail perspective view of one of the friction plates.

Figure 7 is a similar view of another friction plate.

Figure 8 is a perspective view of the inner adjustable bar of the awning frame.

Figure 9 is a fragmentary view showing a slightly different form of inner rod for the awning frame.

Figure 10 is a section on the line 10—10 of Figure 9.

Figure 11 is a fragmentary sectional view showing a slightly different form of outer rod.

Figure 12 is a fragmentary view showing details of the invention in separated relation.

Referring to the drawings in detail wherein like characters of reference denote corresponding parts, the reference character 10 indicates a portion of the body of an automobile and 11 a portion of a door, and 12 the window opening provided in the door. While the invention is shown as applied to an automobile door, it is equally well adapted for application to the windows of railway cars, busses and in various other places.

The awning comprises a frame which includes an inner bar or rod 13, an outer bar or rod 14 and side rods 15, the inner and outer rods 13 and 14 being longitudinally adjustable so that their lengths may be regulated in accordance with the width of the window to which the awning is applied.

The inner rod 13 comprises an outer tubular member 16 which receives in one end a rod section 17. This rod section is provided with an opening for the reception of a pin 18 and this pin is adapted to be positioned within any one of a number of spaced openings 19 provided in the tubular member 16. The length of the inner rod 13 may thus be adjusted. Extending from the opposite end of the tubular member 16 is a rod section 20, this rod section and the rod section 17 extending beyond the opposite ends of the tubular member 16. A spring 21 which is located within the member 16 has one end bearing against a rod section 20 while its other end bears against a pin 22 which may be positioned in any one of a number of openings 23 provided in the tubular member 16 to regulate the tension of the spring 21. The rod sections 17 and 20 are longitudinally slitted as shown at 24 and the tubular member 16 is provided with indentations 25 which form projections upon the inside of the tubular member and are received within the slits 24 to prevent independent rotary movement of the rod sections and tubular member while permitting of relative longitudinal movement.

The outer rod 14 is formed of telescopic sections 26 and 27, the last mentioned section having mounted thereon a sleeve 28, while a filler sleeve 29 is also mounted upon the section 27 between the sleeve 28 and the end of the section 26 so that the diameter of the outer rod 14 may be uniform throughout its length. The sleeve 29 may be of any suitable material such as rubber tubing and may be cut to the desired length so as to conform to the width of the awning. The side rods 15 have their outer ends rigidly secured in the ends of the rod 14 while their inner ends have a snug sliding fit within openings 30 provided in the ends of the rod sections 17 and 20. A frame is thus provided upon which is secured a cover 31, the inner and outer ends of this cover being provided with tubular portions which receive the rods 16 and 14.

The outer extremities of the rod sections 17 and 20 have a snug fit within the usual grooves 32 provided for slidingly receiving the side edges of the window glass 33, these grooves having therein the usual compressible lining 34. The window frame is also provided with a top groove 35 as is usual in windows of this type for receiving the upper edge of the glass 33.

Mounted upon the outer ends of the rod 13 are bearing plates 35 and 37. The bearing plates 36 are adapted to bear against the inner face of the window frame and are provided with lugs 38, 38' which enter the grooves 32 and hold the plates 36 against rotary movement. The plates 37 are also mounted upon the rod 13 and are provided with spaced lugs 39, 39' which receive the adjacent ends of the side rods 15. A flange 40 extends at rightangles from each of the plates 37 and is adapted to engage the upper edge of the window opening when the awning is extended, as shown in Figure 2 of the drawings. A compressible friction washer 41 is interposed between the plates 36 and 37.

Extending longitudinally of the inner rod 13 upon diametrically opposite sides of the said rod are flexible ribs 42, 42'. These ribs are preferably formed of the same material as the cover 31 and when the awning is extended as shown in the full line position of Figure 2 of the drawings, one rib will enter the upper groove 35, while the upper edge of the window glass 33 will engage the lower edge of the lower rib 42 and will provide a water-proof joint. The awning is adapted to be pivotally moved to the dotted line position shown in Figure 2 when not in use and when in this position, the position of the ribs 42 will be reversed so that a water-proof joint is provided at the upper end of the window either when the awning is in or out of use.

After the width of the awning has been properly regulated and the opposite ends of the inner rod 13 forced into the grooves 32, the action of the spring 21 will act to frictionally bind the plates 36 and 37 and the washers 41 so that the awning will be frictionally maintained in any adjusted position. In addition, the action of this spring will force the plates 37 to frictionally engage the inner ends of the rods 15 and prevent longitudinal movement of the rod with respect to the inner rod 13 so that the awning cover may be adjusted and maintained in taut condition.

While the ends of the rod 13 are shown positioned within the grooves 32, it is obvious that suitable bearing plates may be attached to the window to receive the ends of the rods. It is however preferred to mount the rod within these grooves so that the awning may be attached without boring holes or in any manner defacing the finished window frame.

In Figure 9 there is illustrated a slightly different form of rod 13$^a$. This rod comprises a longitudinally split tubular section 38 which receives a section 39 in one end and a section 40 in the opposite end. The section 39 is longitudinally adjustable within the section 38 and is held in adjusted position by means of a set screw 41 which passes through the slit of the tubular member 38 and engages the section 39. A pin 42 extends from the section 40 into the slit of the tubular member 38, while this section 40 is yieldingly forced outward by means of a spring 43. The section 42 may thus move longitudinally, but is held against independent rotary movement, while the section 39 may be adjusted longitudinally with respect to the tubular member 38 and is held in adjusted position by the screw 41 which also prevents independent rotary movement of the section 39.

In Figure 11 there is illustrated a slightly different form of outer rod. This rod comprises a tubular member 45 whose opposite ends are adapted to receive the rightangle 46 of side rods 15$^a$. When this form of rod is used, the tubular member is cut to the desired length and the rightangled ends 46 inserted.

The invention is susceptible of various changes in its form, proportions and minor details of construction and the right is herein reserved to make such changes as properly fall within the scope of the appended claims.

Having described the invention what is claimed is:—

1. In an awning, a frame including an inner rod having its opposite ends adapted to be positioned within grooves provided in a support, an outer rod and side rods connecting the inner and outer rods, a cover secured to the awning frame, a bearing plate upon each end of the inner rod and rigid with respect to the support, a plate upon each end of the rod, and rigid with respect to the awning frame and frictionally engaging the first referred to plates to hold the awning in adjusted position and means to yieldingly force the plates into such engagement.

2. In an awning, a frame including an inner rod having its opposite ends adapted to be positioned within grooves provided in a support, an outer rod and side rods connecting the inner and outer rods, a cover secured to the awning frame, a bearing plate upon each end of the inner rod and rigid with respect to the support, a plate upon each end of the rod, and rigid with respect to the awning frame and frictionally engaging the first referred to plates to hold the awning in adjusted position and means included in the inner bar of the awning frame to yieldingly force the plates into such engagement.

3. An awning adapted for use with a window frame having guide grooves in its opposite sides, said awning comprising a frame including an inner rod having its opposite ends adapted to be positioned within said grooves, an outer rod and side rods connecting the inner and outer rods, a sliding connection between the inner rod and the adjacent ends of the side rods, a cover for said frame, a pivotally adjustable mounting for the inner ends of the rods and combined means to frictionally hold the awning in adjusted position and the side rods against sliding movement with respect to the inner rod.

4. An awning adapted for use with a window frame having guide grooves in its opposite sides and top to slidingly receive a window glass, comprising an awning frame mounted for swinging movement within the window frame, means to hold the awning frame in adjusted position, a fabric cover for the awning frame and means extending from the cover to provide a waterproof joint between the upper edge of the window glass and the upper edge of the window frame when the awning is in or out of position for use.

5. An awning adapted for use with a window frame having guide grooves in its opposite sides and top to slidingly receive a window glass, comprising an awning frame mounted for swinging movement within the window frame, means to hold the awning frame in adjusted position, a cover for the awning frame, and oppositely disposed flexible ribs extending along the inner edge of the awning frame to provide a waterproof joint between the upper edge of the window glass and the upper edge of the window frame.

6. An awning adapted for use with a window frame having guide grooves in its opposite sides to slidingly receive a window glass, comprising a frame including an inner rod having its opposite ends adapted to be positioned within said grooves, a bearing plate upon each end of said rod, lugs carried by the bearing plate and adapted for engagement within the grooves of the window frame to hold said plate rigid with respect to the window frame, a second plate upon each end of the rod, spaced lugs extending from the last referred to plates to engage the awning frame and hold said plates rigid with respect to said frame and means to provide a yielding frictional engagement between the adjacent plates at each end of the rod.

In testimony whereof I affix my signature.

JAMES L. DROHEN.